United States Patent [19]
Dixon

[11] Patent Number: 4,520,846

[45] Date of Patent: Jun. 4, 1985

[54] VALVE

[75] Inventor: Robert W. Dixon, Concord, Calif.

[73] Assignee: Chas. M. Bailey Co., Inc., Emeryville, Calif.

[21] Appl. No.: 523,142

[22] Filed: Aug. 15, 1983

[51] Int. Cl.³ .............................................. F16K 3/26
[52] U.S. Cl. ......................... 137/625.3; 137/625.38; 251/63.5
[58] Field of Search .......... 137/625.3, 625.37, 625.38, 137/625.39; 251/344, 63.5

[56] References Cited

U.S. PATENT DOCUMENTS 696,471   4/1902   Neil ............................ 137/625.3 X
1,938,943 12/1933  Terry ........................ 137/625.38 X
3,514,071  5/1970  Moffatt ..................... 137/625.38 X
3,605,787  9/1971  Krogfoss et al. .......... 137/625.38 X
4,080,982  3/1978  Maezawa ................... 137/625.3 X Primary Examiner—Arnold Rosenthal
Attorney, Agent, or Firm—Lothrop & West

[57] ABSTRACT

A valve, primarily to control hydraulic flow, has a mounting tube ending in a disc spaced from the end of the tube to allow a flow passage. A polyjet sleeve, with multiple orifices through its wall, is axially slidable along the exterior of the mounting tube and on the exterior of the disc. An actuator, preferably hydraulic, moves the polyjet sleeve across the flow passage to vary the effective size of the flow passage.

1 Claim, 3 Drawing Figures

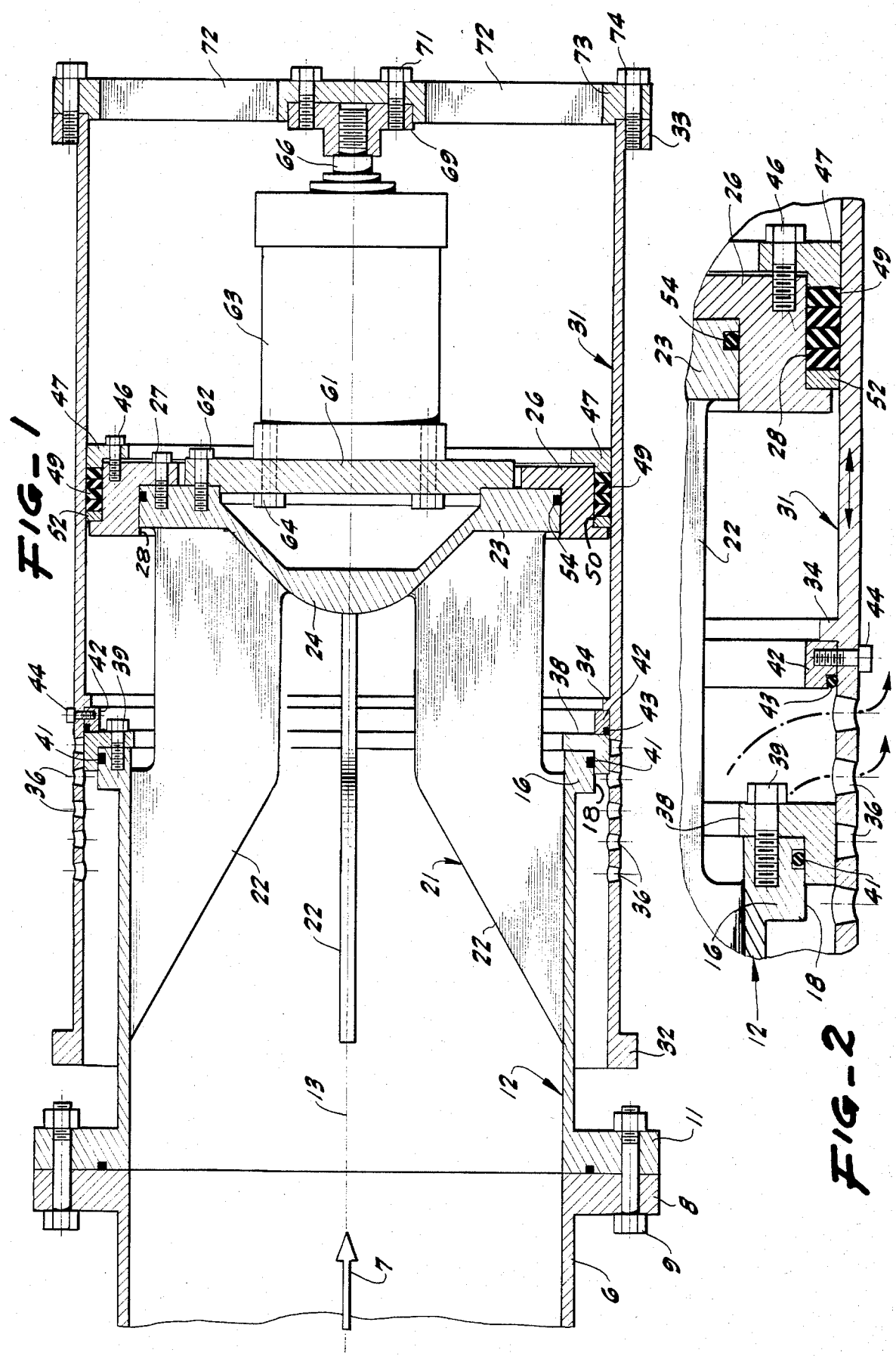

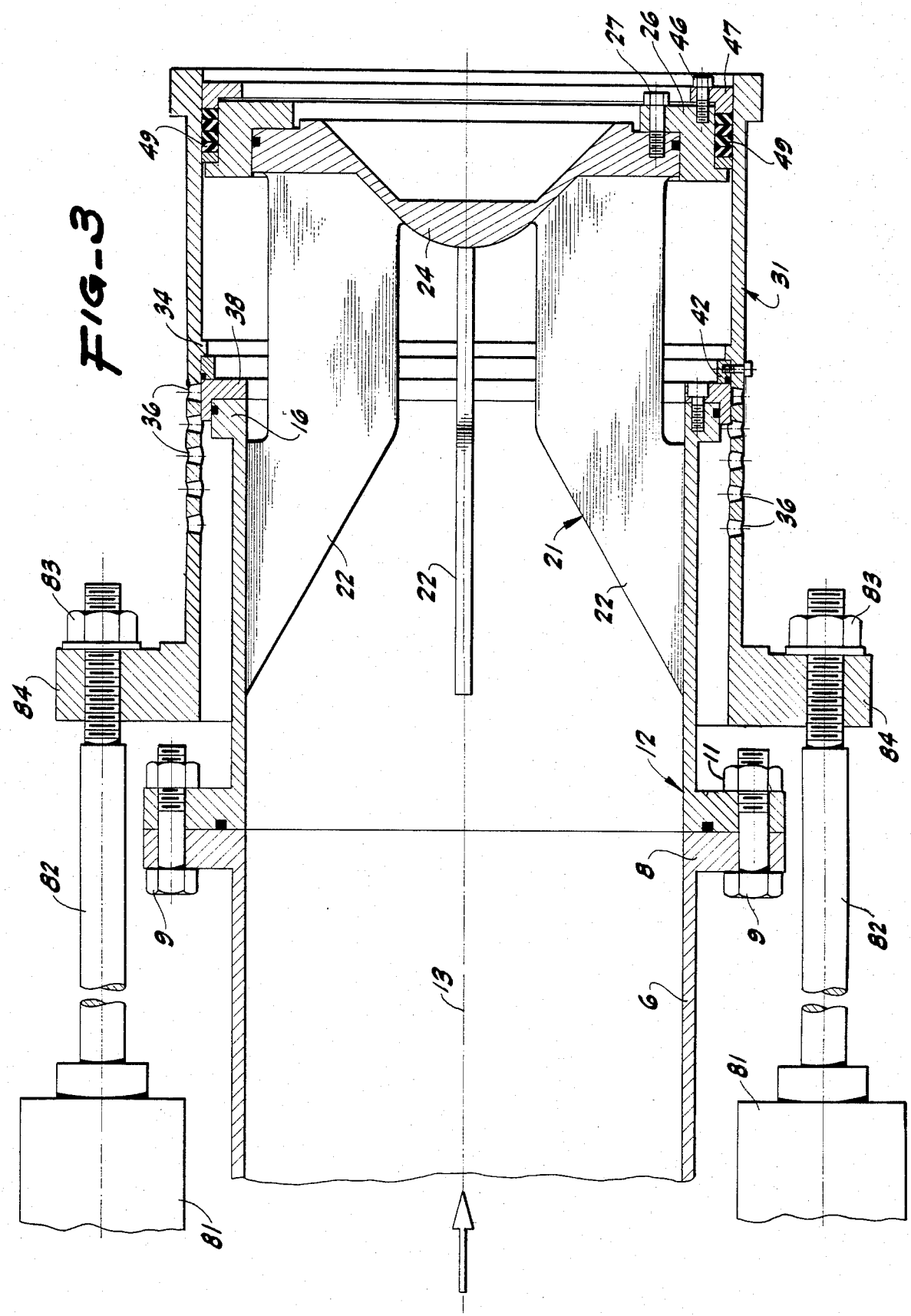

VALVE

CROSS-REFERENCES TO RELATED APPLICATIONS

Co-pending with this application are two patent applications entitled "POLYJET VALVE WITH BACKWASH" and "DISCHARGE VALVE", the first being Ser. No. 520,639 filed Aug. 5, 1983, and the other being Ser. No. 520,650 filed Aug. 5, 1983.

BRIEF SUMMARY OF THE INVENTION

For use in controlling the flow of water, particularly for massive fluid discharge, a fixed mounting tube, concentric with an axis, slidingly supports a surrounding polyjet sleeve perforated with a large number of orifices. There is also a fixed supporting disc slidingly engaging the interior of the polyjet sleeve and itself supported from the mounting tube by a spider. A hydraulic cylinder and piston arrangement is utilized for moving the external polyjet sleeve axially along the mounting tube and over the supporting disc for controlling the number of polyjet openings available for throughflow of the fluid.

PRIOR ART

The principal prior art of interest is U.S. Pat. No. 3,605,787 issued Sept. 20, 1971 to Krogfoss and Dixon. This shows a valve of the polyjet type but differs substantially from the present disclosure.

BRIEF DESCRIPTION OF THE SEVERAL VIEWS OF THE DRAWINGS

FIG. 1 is a cross-section on a longitudinal, diametrical plane through a valve constructed pursuant to the invention and utilizing one form of polyjet sleeve moving device, the valve being in closed position.

FIG. 2 is an enlargement of a portion of the showing of FIG. 1 with the valve in partially open position.

FIG. 3 is a view comparable to FIG. 1, but showing a different form of polyjet sleeve moving device.

DETAILED DESCRIPTION

There are many instances involving the discharge of water; for example, from a high dam or the like, in which the discharge needs to be carefully controlled and to be dissipated in such a fashion as not to cause any surrounding difficulty. This is often to atmosphere but is sometimes arranged by effectuating the discharge below the surface of an afterbay or the like.

In the present instance, the form of valve shown in FIG. 1 is arranged to be coupled to a supply pipe 6 having flow therein in the general direction of the arrow 7. The supply pipe 6 is equipped with a peripheral flange 8 as usual, secured by fastenings 9 to the corresponding flange 11 of a mounting tube 12. The tube 12 is preferably circular-cylindrical about an axis 13. The mounting tube 12 extends along the axis to a supporting ring 16. This ring is likewise concentric with the axis 13 and has a circular-cylindrical exterior surface 18.

Forming part of or secured to the mounting tube 12 is a cage 21 extending in an axial direction and having a number of individual fins 22 (conveniently four in number) springing from the mounting tube 12 and extending toward the axis 13 and finally merging with an end plate 23 through a dome configuration 24. The end plate 23 carries a surrounding, supporting band 26 Z-shaped in cross-section and removably secured to the end plate 23 by fasteners 27. The band 26 has a generally circular-cylindrical, interior surface 28.

Concentric with the axis 13 and surrounding the mounting tube 12 is a polyjet tubular sleeve 31 of a generally cylindrical nature. The polyjet sleeve 31 has a reenforcing flange 32 at one end and a reenforcing flange 33 at the other end. Between the flange 32 and an interior rib 34 is a series of openings 36 or ports in number and in position corresponding to the teachings in the above-identified polyjet U.S. Pat. No. 3,605,787.

The polyjet sleeve 31 rests slidingly on the exterior, cylindrical surface of a shoe 38 fastened by bolts 39 to the ring 16. Conveniently, the shoe 38 is made L-shape in cross-section and of good bearing material. A particular seal against the mounting tube 12 is afforded by an O-ring 41 positioned in the ring 16 on the tube 12. There is also an internal seal band 42 abutting the rib 34 and carrying an O-ring 43. The band 42 is fastened in position by a number of radial screws 44.

The supporting band 26 has a group of fastenings 46 securing a packing ring 47 against a series of packings 49 surrounding the exterior of a surface 50 on the supporting band 26. There is an end ring 52 to support the packings 49 and preferably of bronze to ride smoothly against the interior surface of the polyjet sleeve 31. Any leakage between the supporting band 26 and the end plate 23 is precluded by an O-ring 54.

In this fashion the external polyjet sleeve 31 is mounted for free axial translation with respect to the mounting tube 12 by sliding on the shoe 38 as well as on the end ring 52 and the packing 49 and possibly on the packing ring 47.

In order to move the polyjet sleeve 31 relative to the mounting tube 12 in an axial direction, in one instance the end plate 23 supports a disc 61 held in position by fastenings 62 and itself serving as a support for a hydraulic cylinder 63 secured in position by appropriate fasteners 64. A piston rod 66 extends from the hydraulic cylinder and is in engagement with a foot 69 secured in position by fasteners 71 to a spider 72, having substantial open portions, and extending to a rim 73 held by fastenings 74 to the reenforcing flange 33 of the polyjet sleeve. The hydraulic cylinder has a controlled supply and discharge of fluid under pressure, such structures not being shown, as they are standard.

In the operation of this device, when the hydraulic cylinder 63 is supplied with hydraulic fluid under pressure, the piston rod 66 is expelled toward the right hand in the figure and through the spider 72 moves the surrounding polyjet sleeve 31 toward the right. The sleeve 31 slides so that one or more of the openings 36 is brought across the edge of the shoe 38 and is then effective to permit flow from the interior of the mounting tube 12 through such opening or openings 36 and so through the polyjet sleeve 31 to the exterior. A partial opening is shown in FIG. 2. The more the hydraulic piston rod 66 is expelled from the cylinder 63, the more polyjet openings 36 act as conductors from the interior of the mounting tube to the exterior of the polyjet sleeve. Finally, in an extreme position of the hydraulic piston rod 66, the polyjet sleeve is translated entirely to the right in the drawing so that all of the polyjet openings 36 are effective. This is the maximum open position of the valve.

When the hydraulic cylinder is operated in the reverse direction, then the piston rod 66 is retracted or translated toward the left in the drawing and the polyjet sleeve 31 is moved toward the left, gradually covering or blocking off the polyjet sleeve openings 36. Finally, the parts return to the position shown in FIG. 1 in which all of the openings 36 are covered. There is a seal by the shoe 38 and the O-ring 43 so that in closed position there is substantially no leakage of liquid whatsoever.

This exterior location of the polyjet sleeve is effective to release discharging water through a number of openings and to form a number of jets into the immediate, exterior surroundings. These jets are discharged into the air or into an afterbay below the water surface. They are not then at all disruptive of the surroundings and dissipate the energy of the discharging water quickly. The valve is sometimes provided with a shroud as shown in the above-noted application entitled 'Discharge Valve'.

In the form of the structure shown in FIG. 3, the main arrangement of the device is exactly as described, so similar reference numerals are used. As to the actuating device, however, there is a change. Rather than utilize the cylinder 63 there is preferably provided a plurality of cylinders 81 suitably connected directly or indirectly to the supply pipe 6 in turn secured to the mounting tube 12. The hydraulic cylinders 81 have actuating rods 82 threaded into and locked by nuts 83 adjustably in position in a surrounding flange 84 forming part of the left end of the polyjet sleeve 31. In this instance, instead of having a small reenforcing flange 32, the sleeve 31 rather has a greatly enlarged driving flange 84.

In the operation of this structure the various hydraulic cylinders 81 are supplied with hydraulic fluid under pressure and simultaneously exert force on the actuating rods 82 and so move the polyjet sleeve 31 to the right, for example. This opens the valve by uncovering one or more of the flow passages 36. When the hydraulic connections to the cylinders 81 are reversed, the rods 82 are moved toward the left and retract the polyjet sleeve 31 so that the various sleeve openings 36 are moved out of communication with the interior of the mounting tube 12 and the valve is shut off.

I claim:

1. A valve comprising a mounting tube concentric with an axis, means for supplying one end of said tube with liquid under pressure, a polyjet sleeve having apertures therethrough externally exposed to the atmosphere to discharge said liquid directly to the atmosphere and surrounding and coaxial with said mounting tube, a solid end plate axially spaced from and extending across the other end of said mounting tube, said end plate spanning the interior of said polyjet sleeve, means on said end plate interengaging the interior of said sleeve, an axially extending cage at one end disposed on said mounting tube and disposed along said axis to extend beyond said other end of said mounting tube, means for securing said end plate on said cage, and means interengaging said mounting tube and said polyjet sleeve for moving said polyjet sleeve in axial directions on said mounting tube and across said interengaging means on said end plate.

* * * * *